(12) United States Patent
Zeitlin et al.

(10) Patent No.: US 8,621,628 B2
(45) Date of Patent: Dec. 31, 2013

(54) PROTECTING USER MODE PROCESSES FROM IMPROPER TAMPERING OR TERMINATION

(75) Inventors: Eli Zeitlin, Modiin (IL); Arnon Axelrod, Matan (IL); Anil Francis Thomas, Redmond, WA (US); Kanwaljit Marok, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 308 days.

(21) Appl. No.: 12/713,151

(22) Filed: Feb. 25, 2010

(65) Prior Publication Data
US 2011/0209219 A1 Aug. 25, 2011

(51) Int. Cl.
*G06F 21/00* (2013.01)
(52) U.S. Cl.
USPC .............................. 726/23; 726/26
(58) Field of Classification Search
None
See application file for complete search history.

(56) References Cited

U.S. PATENT DOCUMENTS

| 7,000,100 | B2 | 2/2006 | Lacombe et al. | |
|---|---|---|---|---|
| 7,409,719 | B2 * | 8/2008 | Armstrong et al. | 726/24 |
| 7,448,084 | B1 * | 11/2008 | Apap et al. | 726/24 |
| 7,472,288 | B1 | 12/2008 | Chou et al. | |
| 7,480,683 | B2 * | 1/2009 | Thomas et al. | 1/1 |
| 7,530,106 | B1 * | 5/2009 | Zaitsev et al. | 726/24 |
| 7,546,604 | B2 * | 6/2009 | Xu et al. | 719/313 |
| 7,735,142 | B2 * | 6/2010 | Aaron | 726/25 |
| 2003/0037172 | A1 | 2/2003 | Lacombe et al. | |
| 2006/0101263 | A1 | 5/2006 | Costea et al. | |
| 2006/0242270 | A1 | 10/2006 | Sankaranarayan et al. | |
| 2008/0028469 | A1 * | 1/2008 | Repasi et al. | 726/24 |
| 2009/0038011 | A1 * | 2/2009 | Nadathur | 726/24 |
| 2009/0070878 | A1 * | 3/2009 | Wang et al. | 726/24 |
| 2009/0077664 | A1 * | 3/2009 | Hsu et al. | 726/24 |
| 2009/0083855 | A1 * | 3/2009 | Apap et al. | 726/24 |
| 2009/0204978 | A1 | 8/2009 | Lee et al. | |
| 2010/0043072 | A1 * | 2/2010 | Rothwell | 726/24 |

OTHER PUBLICATIONS

Mark Russinovich, "Inside Windows Vista User Account Control" TechNet Magazine (Jun. 2007).*
"AntiHook: Host Intrusion Prevention System by Info Process Pty Ltd.", Aug. 29, 2006, pp. 1-13.
Herder, Jorrit N. et al, "Construction of a Highly Dependable Operating System", Proceedings of the Sixth European Dependable Computing Conference (EDCC'06), Oct. 18-20, 2006, pp. 1-10.
David, Francis M. and Campbell, Roy H., "Recovering from Operating System Errors" Retrieval Date: Jan. 25, 2010, pp. 1-10.
Murakami, Junichi, "A Hypervisor IPS based on Hardware assisted Virtualization Technology," Retrieval Date: Jan. 25, 2010, pp. 1-10.

* cited by examiner

*Primary Examiner* — Hadi Armouche

(57) ABSTRACT

In one embodiment, a malware protection system may protect a computing system from a malware event. A data storage device 150 may store a watchdog filter driver 240 integrated with an operating system kernel 210. A processor 120 may intercept a process access to an application process 220 with the watchdog filter driver 240 to detect a malware event. The processor 120 may use the watchdog filter driver 240 to determine an originating process for the malware event.

20 Claims, 9 Drawing Sheets

PROTECTING USER MODE PROCESSES FROM IMPROPER TAMPERING OR TERMINATION

BACKGROUND

The normal operation of a computing system may be greatly harmed by an infestation of malicious software, also referred to as "malware". Malware is any software or program code that covertly or fraudulently infiltrates a computing system. Malware may refer to computer viruses, Trojan horses, worms, spyware, adware, or other malicious code. A malware event may be any attempt by malware to stop, corrupt, or convert a file, a system registry, an application process, or other data or processing feature of the computing system. The malware event may be a successful or an unsuccessful malware attack. To protect a computing system, a user may implement a defensive product, such as a firewall, antivirus software, spyware monitors, and other protective software.

A computing system may encounter difficulties even beyond malware. A process of an application running in a reduced level of resource access may be easily stopped, corrupted or converted by malware, a user, or by an internal crash of the process. Once the process has been stopped by malware, the malware may tamper with the process and show the same user experience to the user. Thus, the user may not even realize that the process is not running. The user may unwittingly reveal confidential, private, or financially damaging information.

Further, an operating system may not support application recovery and restart (ARP). Thus, a crash in the process may kill the process without any resurrection. Thus, malware that kills a process may damage a computing system even if the malware fails to replace the process being presented to the user.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

Embodiments discussed below relate to protecting a computing system from a malware event using a malware protection system. In one embodiment, a data storage device stores a watchdog filter driver integrated with an operating system kernel. A processor intercepts a process access to an application process with the watchdog filter driver to detect a malware event. The watchdog filter driver determines an originating process for the malware event.

DRAWINGS

In order to describe the manner in which the above-recited and other advantages and features can be obtained, a more particular description is set forth and will be rendered by reference to specific embodiments thereof which are illustrated in the appended drawings. Understanding that these drawings depict only typical embodiments and are not therefore to be considered to be limiting of its scope, implementations will be described and explained with additional specificity and detail through the use of the accompanying drawings.

DETAILED DESCRIPTION

Embodiments are discussed in detail below. While specific implementations are discussed, it should be understood that this is done for illustration purposes only. A person skilled in the relevant art will recognize that other components and configurations may be used without parting from the spirit and scope of the subject matter of this disclosure. The implementations may be a machine-implemented method, a tangible machine-readable medium having a set of instructions detailing a method stored thereon for at least one processor, or a malware protections system for a computing device.

A malware protection system may protect a user from a malware event by implementing a "watchdog" protection architecture. A watchdog protection architecture is a computer architecture that has a dedicated filter driver, referred to herein as a "watchdog" filter driver, tasked with monitoring the processes of an active application, or application processes, for malware events. A watchdog filter driver is a kernel application that intercepts a request for a process object reference, referred to herein as an "open handle" request, from an application process to a resource manager of an operating system kernel. The process object reference is a reference to a data structure of an application process that allows another application process to access and interact with that application process. The operating system kernel is the main interface between applications and hardware on a computer. The watchdog filter driver may be an expansion, or "minifilter", added on to an existing filter driver in the operating system kernel. The watchdog filter driver may be integrated with the operating system kernel. The watchdog filter driver may monitor the intercepted open handle requests to detect a malware event. A malware event may be an attempt to stop, corrupt, or convert an application process, a system registry, or a file. The watchdog filter driver may prevent the malware event by removing a process access, or access right, from the process object reference returned to the application process. The watchdog filter driver may further be used to determine the application process that causes the malware event, herein referred to as an originating process.

For security purposes, a computer operating system may provide different levels of access to resources, with kernel mode representing the highest level of access and user mode representing the lowest level of access. The watchdog filter driver may act from the kernel mode to prevent an application process running in user mode from being terminated. The watchdog filter driver may watch for an attempted process termination and other malicious activity and prevent such attempts. If the application process terminates, either due to a crash or a user exiting the user interface (UI), a driver, service, or shell extension may relaunch the process.

A shell extension is an update or expansion to a system file manager, commonly referred to as a "shell". The shell extension may restart an application process that has been terminated. The shell extension may watch for processes running in the user mode. The shell extensions may be loaded into a file manager process, making disabling the shell extension difficult. The file manager process may be running in a user context or in a system context. An application process running in a user context runs in the user mode and interacts directly with the user. Alternately, an application process running in the system context runs in the user mode performing system functions without interacting with the user.

Figure 1:
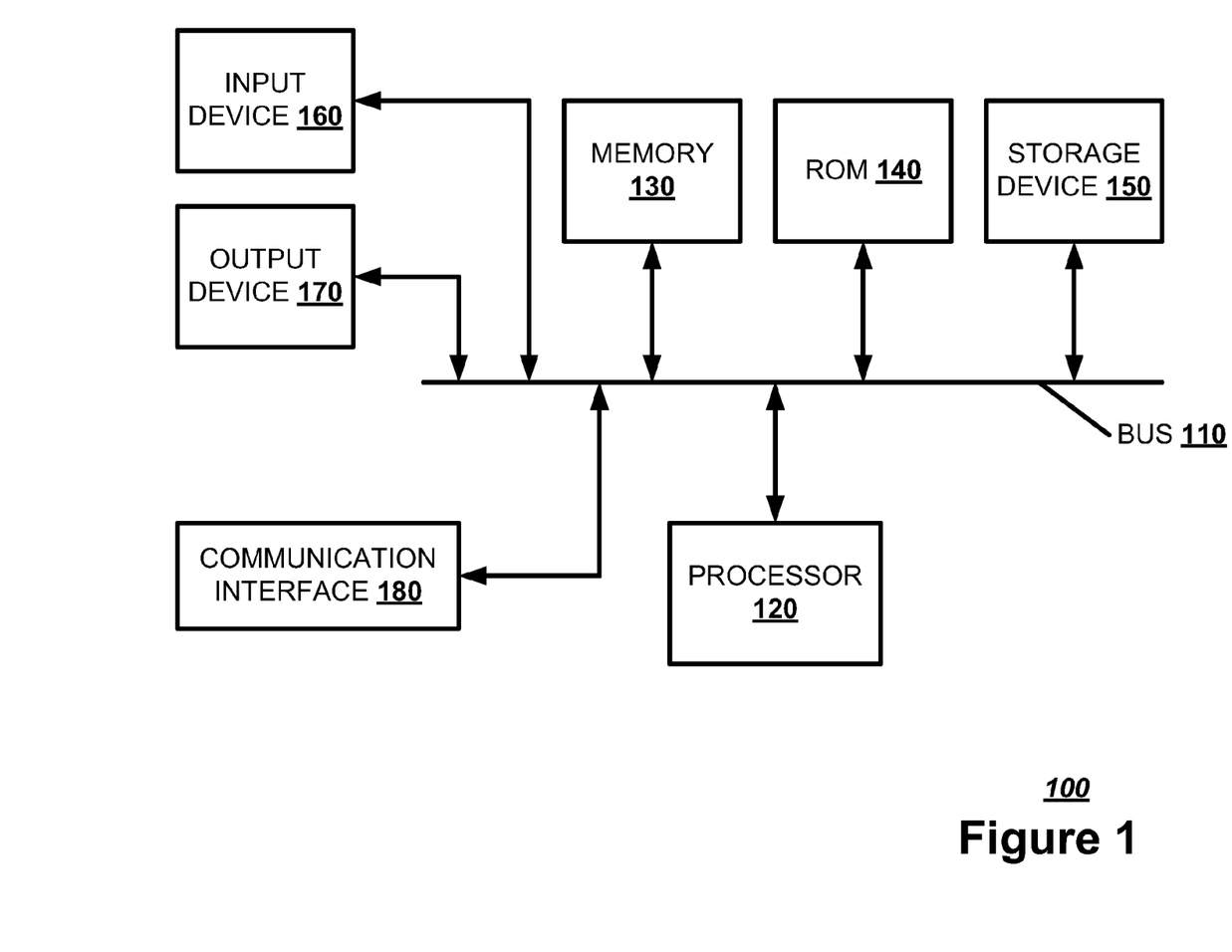
FIG. 1 illustrates a block diagram of an exemplary computing device.

FIG. 1 illustrates a block diagram of an exemplary computing device 100 which may use a watchdog protection architecture. The computing device 100 may be a personal computer, laptop, handheld computer, or other computer device. The computing device 100 may include a bus 110, a processor 120, a memory 130, a read only memory (ROM) 140, a storage device 150, an input device 160, an output device 170, and a communication interface 180. The bus 110 may permit communication among the components of the computing device 100.

The processor 120 may include at least one conventional processor or microprocessor that interprets and executes a set of instructions. The memory 130 may be a random access memory (RAM) or another type of dynamic storage device that stores information and instructions for execution by the processor 120. The memory 130 may also store temporary variables or other intermediate information used during execution of instructions by the processor 120. The ROM 140 may include a conventional ROM device or another type of static storage device that stores static information and instructions for the processor 120. The storage device 150 may include any type of tangible machine-readable medium, such as, for example, magnetic or optical recording media and its corresponding drive. The storage device 150 may store a set of instructions detailing a method that when executed by one or more processors cause the one or more processors to perform the method.

The input device 160 may include one or more conventional mechanisms that permit a user to input information to the computing device 100, such as a keyboard, a mouse, a voice recognition device, a microphone, a headset, etc. The output device 170 may include one or more conventional mechanisms that output information to the user, including a display, a printer, one or more speakers, a headset, or a medium, such as a memory, or a magnetic or optical disk and a corresponding disk drive. The communication interface 180 may include any transceiver-like mechanism that enables processing device 100 to communicate with other devices or networks. The communication interface 180 may include a network interface or a pairing interface. The interface may be a wireless, wired, or optical interface. In one embodiment, the interface may include a universal serial bus (USB) interface, a Bluetooth® interface, or other such interface that may be used to attach peripheral devices or pair other communication devices.

The computing device 100 may perform such functions in response to processor 120 executing sequences of instructions contained in a computer-readable medium, such as, for example, the memory 130, a magnetic disk, or an optical disk. Such instructions may be read into the memory 130 from another computer-readable medium, such as the storage device 150, or from a separate device via the communication interface 180.

Figure 2:
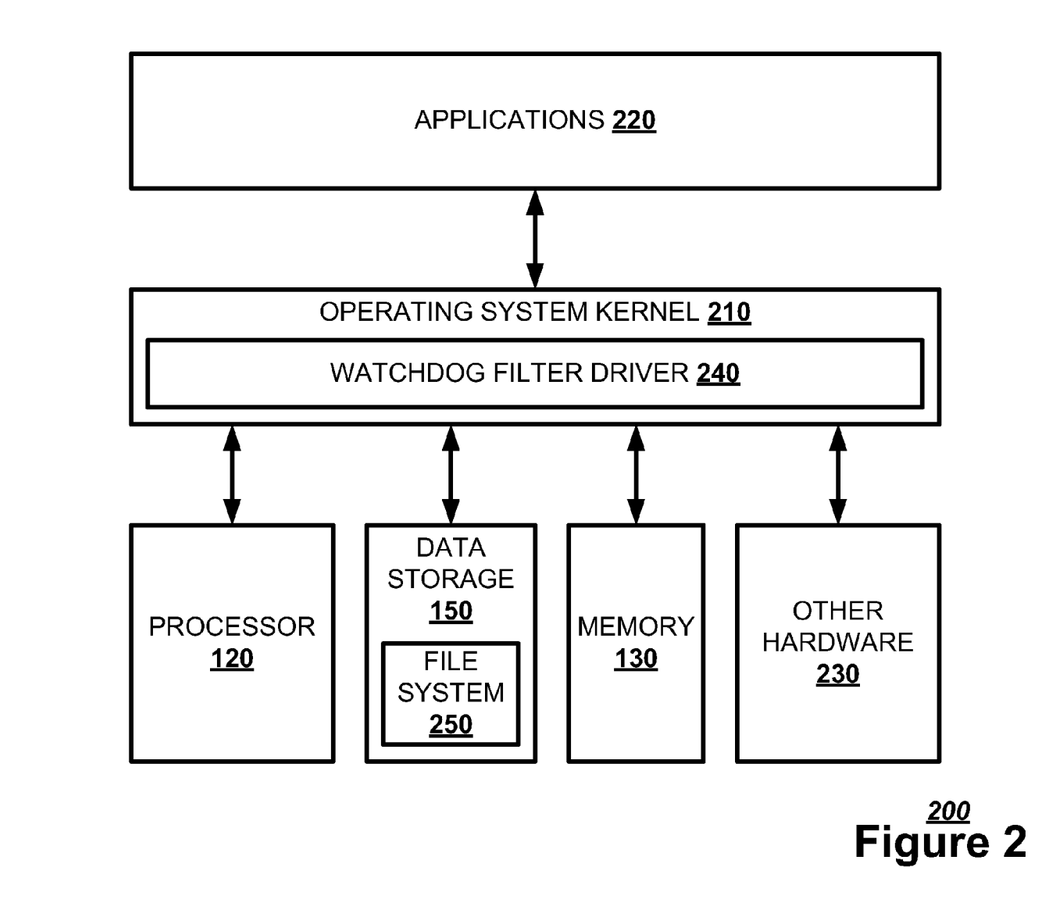
FIG. 2 illustrates a block diagram of a kernel-centric computer architecture.

The computing device 100 may implement a watchdog protection architecture to prevent the occurrence of a malware event. FIG. 2 illustrates, in a block diagram, one embodiment of a kernel-centric computer architecture 200. A computing device 100 may have an operating system kernel 210 that allows higher level applications 220 to interact with a processor 120, a memory 130, a data storage 150, or other hardware 230, such as a printer, a graphics processing card, peripherals, and other devices. By integrating a watchdog filter driver 240 with the operating system kernel 210, watchdog protection may be implemented uniformly across several programs. Additionally, at the kernel level, the watchdog filter driver 240 may be protected from interference by malware. Further, at the kernel level, the watchdog filter driver 240 may protect application processes 220 as well as any file system 250 stored in the data storage 150 or other computer operations.

Figure 3:
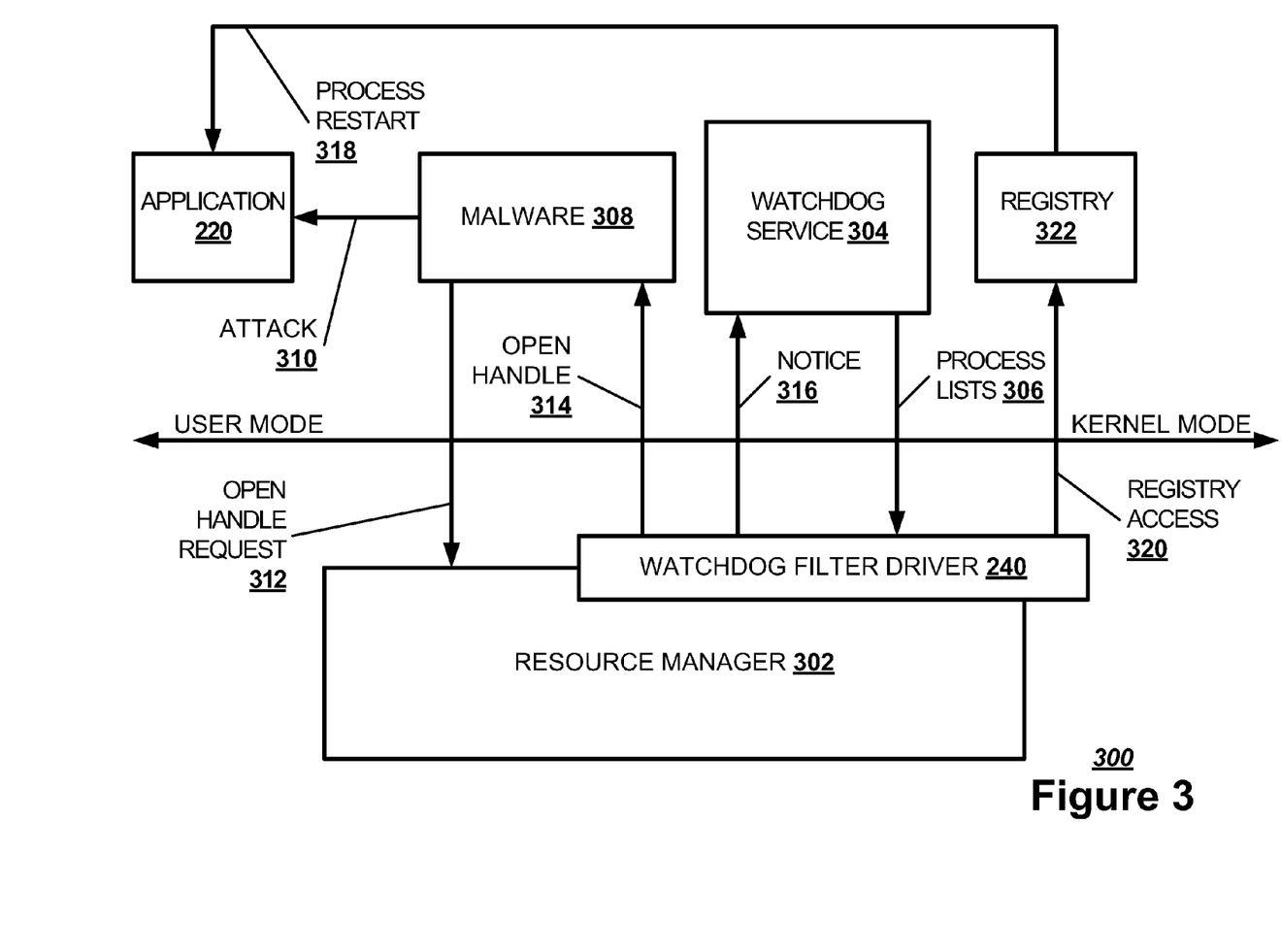
FIG. 3 illustrates, in a block diagram, one embodiment of a watchdog protection architecture.

FIG. 3 illustrates, in a block diagram, the same embodiment in a watchdog-centric architecture 300. For purposes of this diagram, the elements are arranged from a kernel mode level of resource access to a user mode level of resource access. The watchdog protection architecture 300 may implement a watchdog filter driver 240 integrated within an operating system kernel. The watchdog filter driver 240 may prevent malware events from occurring in an application process by monitoring the operations of a resource manager 302 for the operating system kernel 210, such as an object manager.

The watchdog filter driver 240 may implement a watchdog service 304 to monitor and protect a user mode level process of a resident application 220, or an application that remains in memory. The watchdog service 304 may send a list 306 containing both processes to monitor and processes that are exempt from monitoring to the watchdog filter driver 240. A monitored process list 306 may contain processes with an established monitoring protocol. An exempt process list may contain foreign applications for which a monitoring protocol has not yet been established or applications that are expressly forbidden from being monitored. Processes not present on either the monitored process list 306 or the exempt process list 306 may be monitored on a case by case basis. The monitored process list may be updated by a user with a high enough administrative privilege level.

The computing system 100 may become infected with malware 308. The malware 308 may attempt to execute an attack 310 on the resident application 220. An attack 310 is a malicious action that the malware 308 performs on the resident application 220. The attack 310 may be an attempt to terminate the resident application 220, an attempt to open and insert code into the resident application 220, or other malicious acts.

The watchdog filter driver 240 may prevent the malware from successfully terminating or opening an application by filtering the open handle requests 312 to the resource manager 302. A malware attack may be considered successful if the malware succeeds in terminating or corrupting the application process. The watchdog filter driver 240 may respond to the open handle request 312 from malware 308 by returning a filtered process object reference 314, also referred to as a filtered "open handle" 314. The watchdog filter driver 240 may filter the open handle 314 by removing a process access, or access right, from the open handle 314 being returned. The watchdog filter driver 240 may remove such process accesses as a process terminate, a process suspend and resume, a thread terminate, a thread suspend and resume, a process set information, a process virtual machine operations, a process virtual machine write, a thread set context, or other accesses.

The watchdog filter driver 240 may use a kernel filtering application program interface (API) to intercept the process accesses. The kernel filtering API may execute a routine that registers a list of callback routines for thread and process object reference operations with the resource manager 302. A callback routine signals that the resource manager 302 has received an open handle request for the application process 220. If the resource manager invokes a callback routine on the list registered by the kernel filtering API, then the resource manager may alert the watchdog filter driver 240.

Figure 4:
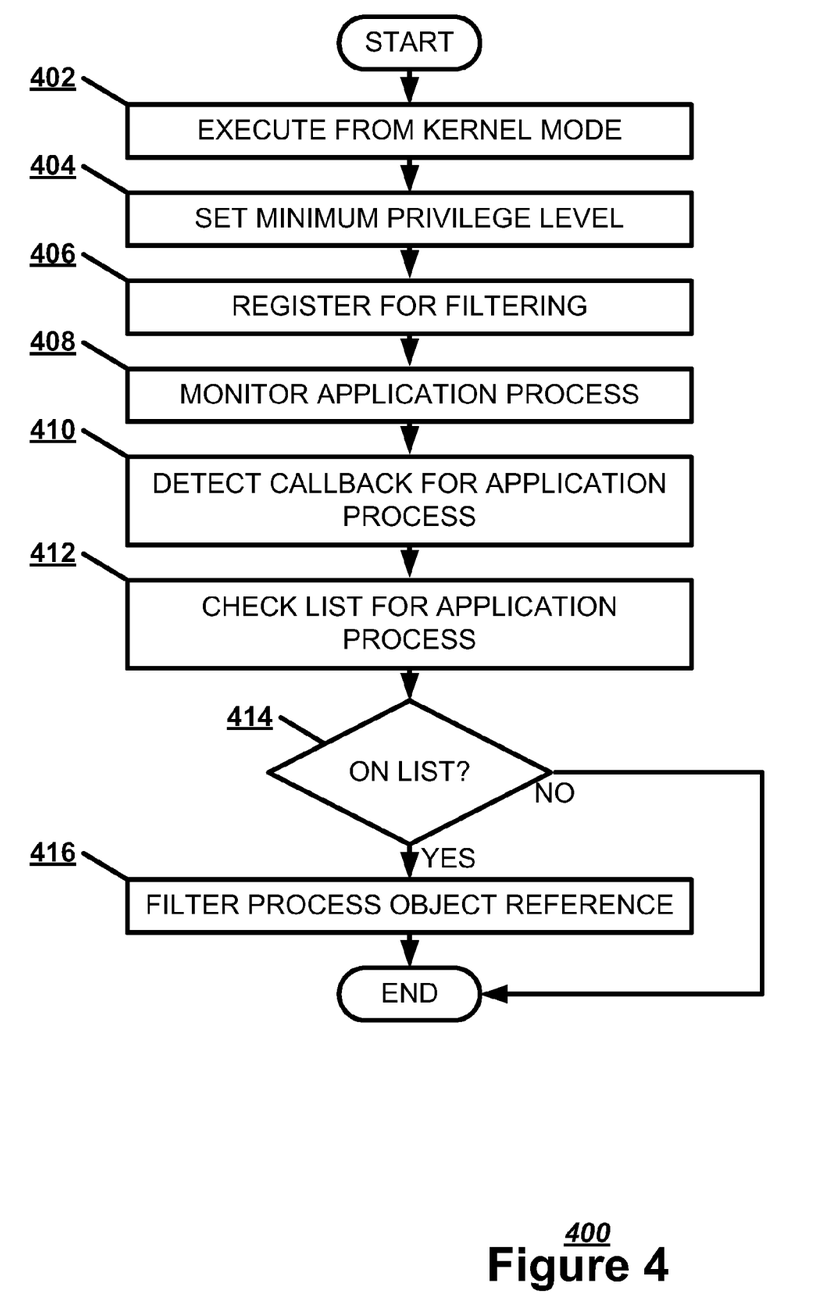
FIG. 4 illustrates, in a flowchart, one embodiment of a method of preventing a successful malware process attack with a watchdog filter driver.

FIG. 4 illustrates, in a flowchart, one embodiment of a method 400 of preventing a successful malware process attack 310 with a watchdog filter driver 240. The watchdog filter driver 240 may execute as part of the operating system kernel in kernel mode (Block 402). The operating system kernel 210 may set a minimum administrative privilege level for disabling the watchdog filter driver 240 (Block 404). The watchdog filter driver 240 may register with the operating system kernel that the watchdog filter driver 240 is filtering the process handle creation (Block 406). The watchdog filter driver 240 may monitor the application process 220 (Block 408). The watchdog filter driver 240 may detect a callback routine on the registered list of callback routines invoked by a resource manager 302 for the application process 220 (Block 410). The watchdog filter driver 240 may check the monitored process list 306 for the application process 220 (Block 412). If the application process 220 is on the monitored process list 306 (Block 414), the watchdog filter driver 240 may filter the open handle 314 sent in return to the open handle request 312 (Block 416).

If for some reason the watchdog filter driver 240 fails to prevent a malware success, or even if the application process 220 crashes for a non-malware reason, the watchdog filter driver 240 may use the watchdog service 304 to relaunch the application process 220. Returning to FIG. 3, the watchdog filter driver 240 may notify 316 the watchdog service 304 if the resident application 220 terminates. The watchdog service 304 may then send a moribund process restart instruction 318 to the terminated process if desired. The moribund process restart instruction 318 is an instruction to a terminated process to restart the process.

Figure 5:
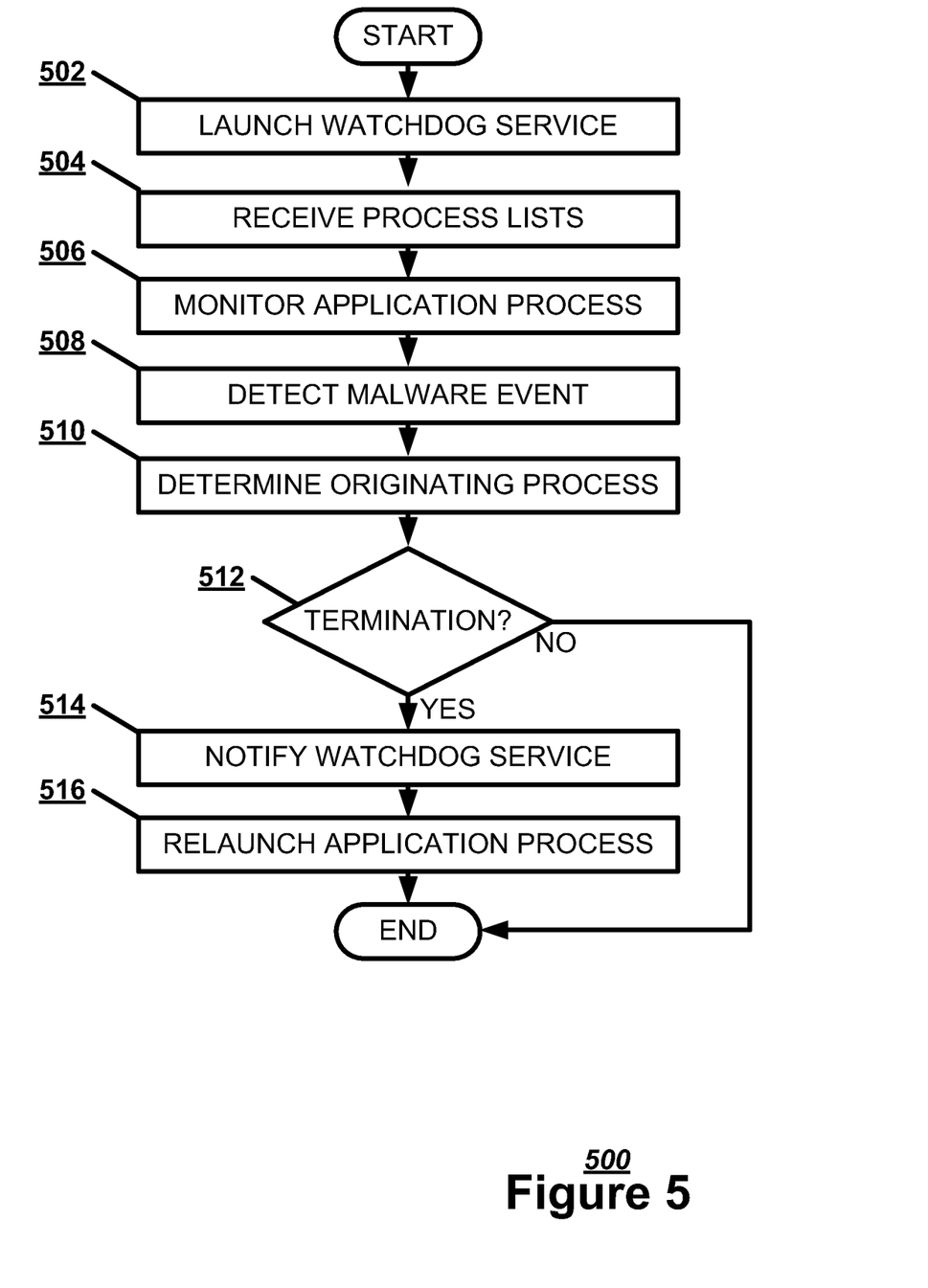
FIG. 5 illustrates, in a flowchart, one embodiment of a method of relaunching a terminated process with a watchdog filter driver.

FIG. 5 illustrates, in a flowchart, one embodiment of a method 500 of relaunching a terminated process with a watchdog filter driver. The watchdog filter driver 240 may launch the watchdog service 304 from the operating system kernel (Block 502). The watchdog filter driver 240 may receive a monitored process list 306 or an exempt process list 306 from the watchdog service 304 (Block 504). The watchdog filter driver 240 may monitor the application process 220 (Block 506). The watchdog filter driver 240 may detect a malware event, such as a termination of the application process (Block 508). The watchdog filter driver 240 may determine an originating process for the malware event (Block 510). The originating process may be the malware 308 that initiated the attack 310. The watchdog filter driver 240 may determine the originating process by monitoring the source of the open handle requests 312 for the targeted process. If the application process 220 has terminated (Block 512), the watchdog filter driver 240 may alert the watchdog service 304 via a notification 316 of the termination of the application 220 (Block 514). The watchdog service 304 may relaunch the application process 220 by sending a moribund process restart instruction 318 to the terminated application 220 (Block 516).

Returning to FIG. 3, the watchdog protection architecture 300 may be expanded beyond the resident application process. To provide further protection to the computing device 100, the watchdog filter driver 240 may monitor registry access requests 320 to the system registry 322 to identify attempts to change the configuration of the operating system. The system registry 322 is a registry that stores configuration information for the operation of the computing device 100. The watchdog filter driver 240 may prevent malware 308 disabling the watchdog filter driver 240 by corrupting watchdog filter driver data in the system registry 322.

Figure 6:
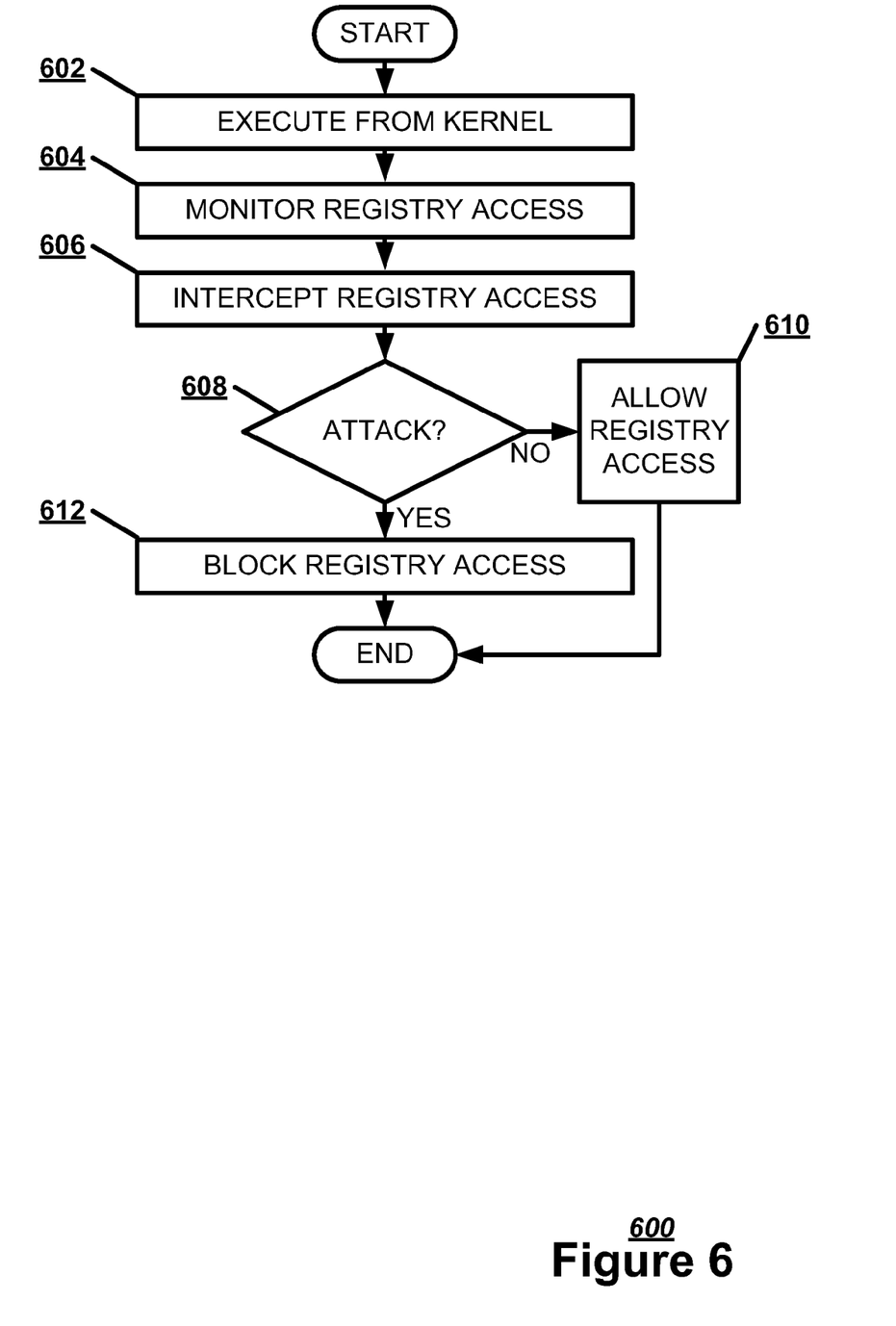
FIG. 6 illustrates, in a flowchart, one embodiment of a method of detecting a malware registry attack with a watchdog filter driver.

FIG. 6 illustrates, in a flowchart, one embodiment of a method 600 of detecting a malware registry attack with a watchdog filter driver 240. The watchdog filter driver 240 may execute from the operating system kernel 210 (Block 602). The watchdog filter driver 240 may monitor registry access requests 320 to the system registry 322 by software applications (Block 604). The watchdog filter driver 240 may intercept at the operating system kernel a registry access request 320 from a software application to the system registry 322 to detect a malware attack (Block 606). The watchdog filter driver 240 may identify a malware attack by analyzing the nature of the registry access request, maintaining a history of registry access request by an application, maintaining a list of known malware applications, or other standard malware identification techniques. If the watchdog filter driver 240 determines that the registry access request 320 is not a malware attack (Block 608), the watchdog filter driver 240 may allow the software application to access the system registry 322 (Block 610). If the watchdog filter driver 240 determines that the registry access request 320 is a malware attack (Block 608), the watchdog filter driver 240 may prevent the malware 308 from successfully attacking the system registry 322 by blocking the registry access request 320 (Block 612).

Figure 7:
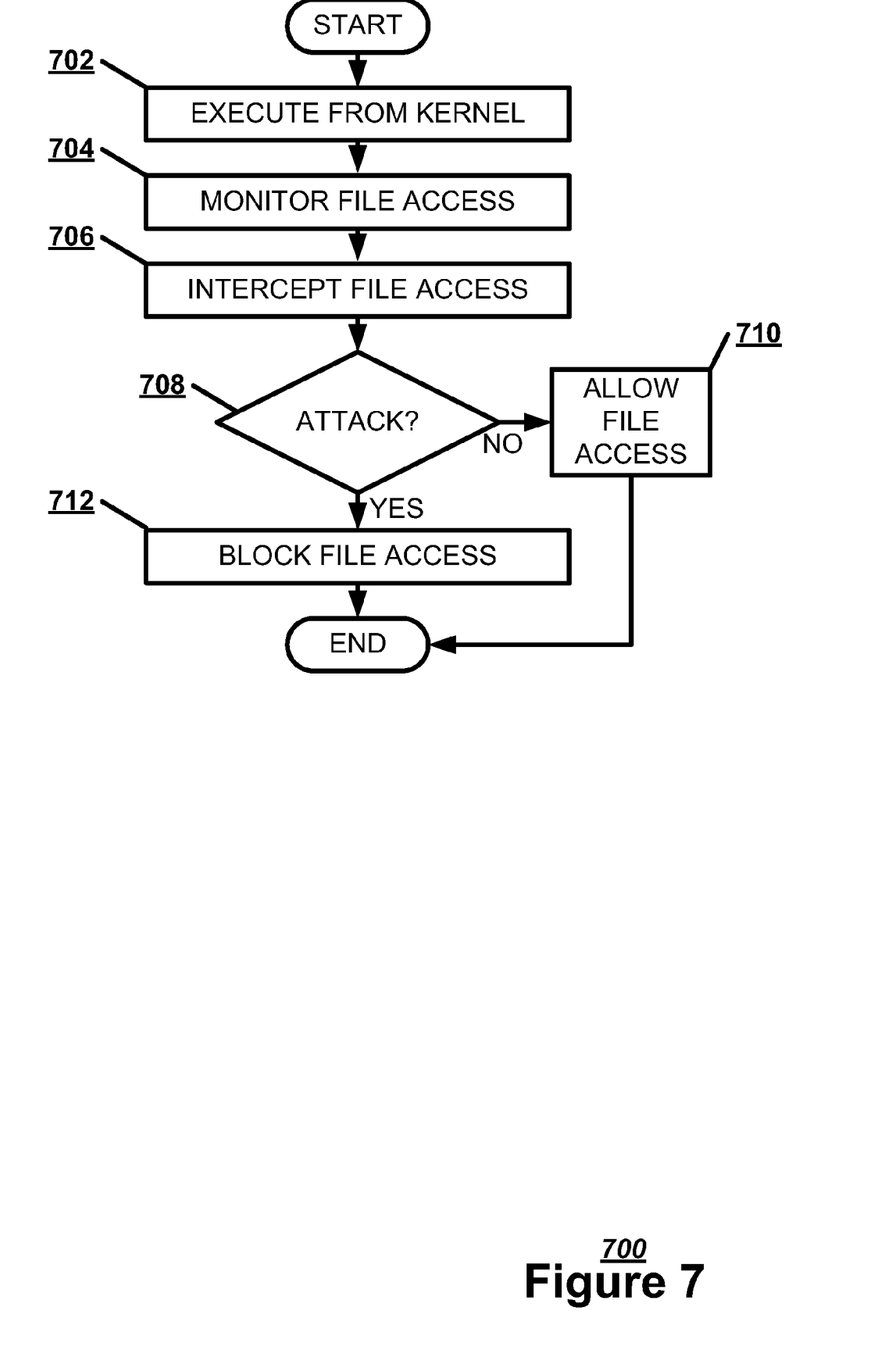
FIG. 7 illustrates, in a flowchart, one embodiment of a method of detecting a malware file attack with a watchdog filter driver.

The watchdog protection architecture 300 may be further expanded beyond the system registry 322 to include monitoring of the file system 250. FIG. 7 illustrates, in a flowchart, one embodiment of a method 700 of detecting a malware file attack with a watchdog filter driver. The watchdog filter driver 240 may execute from the operating system kernel (Block 702). The watchdog filter driver 240 may monitor access to the file system 250 by software applications (Block 704). The watchdog filter driver 240 may intercept at the operating system kernel a file access request from a software application to the file system 250 to detect a malware attack (Block 706). The watchdog filter driver 240 may identify a malware attack by analyzing the nature of the file access request, maintaining a history of file access request by an application, maintaining a list of known malware applications, or other standard malware identification techniques. If the watchdog filter driver determines that the file access request is not a malware attack (Block 708), the watchdog filter driver 240 may allow the software application to access the file (Block 710). If the watchdog filter driver determines that the file access request is a malware attack (Block 708), the watchdog filter driver 240 may prevent the malware 308 from successfully attacking the file by blocking access to the file (Block 712).

Figure 8:
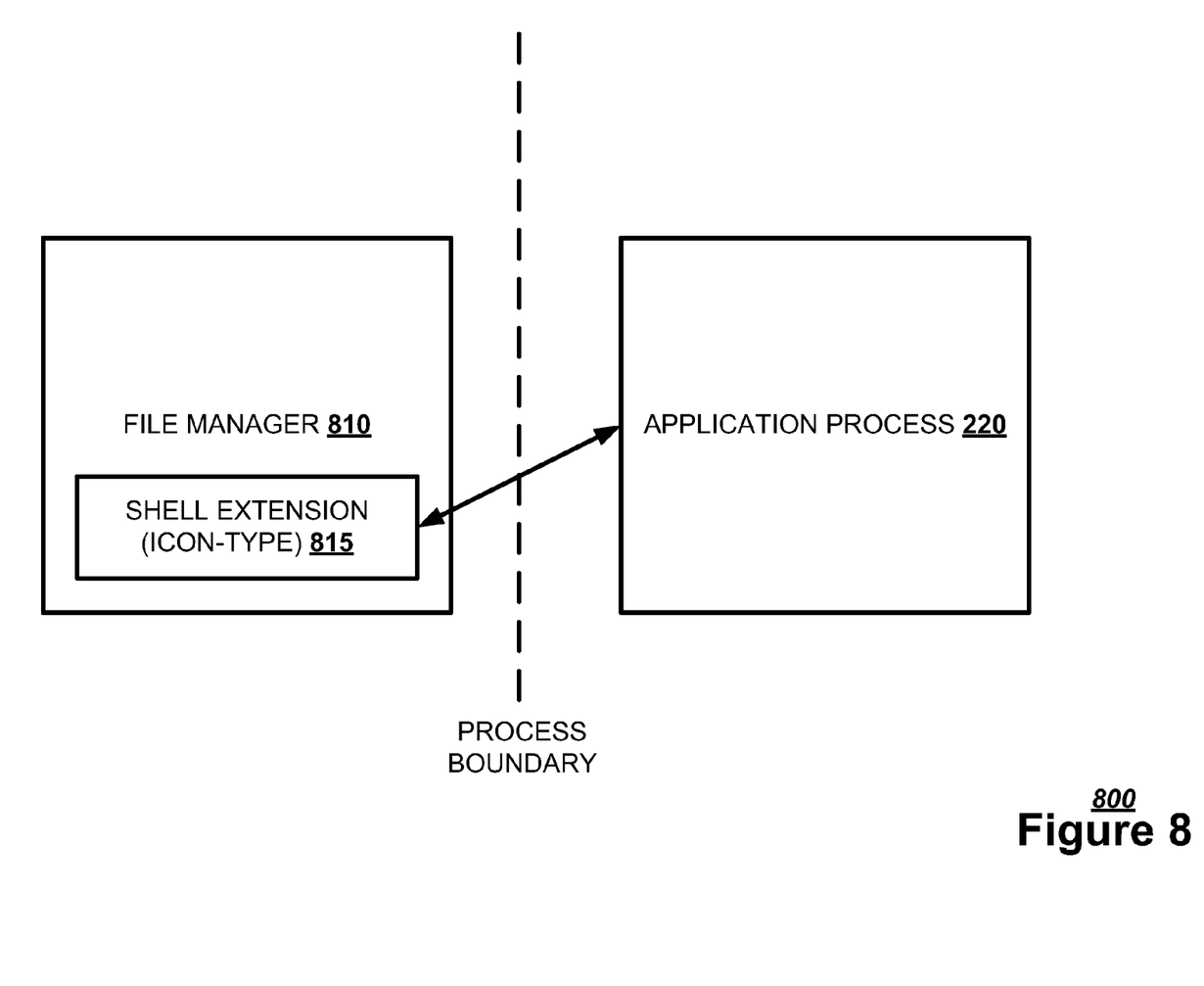
FIG. 8 illustrates, in block diagrams, one embodiment of a relaunch system within a user mode.

The watchdog protection architecture may provide even stronger protection by supplementing the watchdog filter driver 240 and watchdog service 304 with a relaunch system in the user mode. FIG. 8 illustrates, in block diagrams, one embodiment of a relaunch system 800 in the user mode. The relaunch system 800 is an application that relaunches a terminated application process that is running in the user context. An operating system shell 810, or file manager 810, may be updated or expanded using a shell extension 815. A user relaunch shell extension 815 may monitor an application process 220 by sending update requests to the application process, monitoring processor usage, or other monitoring techniques. The user relaunch shell extension 815 may relaunch an application process 220 upon being notified of the termination of that application process 220. The application process 220 may terminate because of malware, an internal bug, or other reason. The user relaunch shell extension 815 may be an icon-type shell extension, as this shell extension 815 may be loaded every time the operating system launches. The icon-type shell extension encodes and displays icons to the user to allow the user to manage and control files using the file manager 810.

Figure 9:
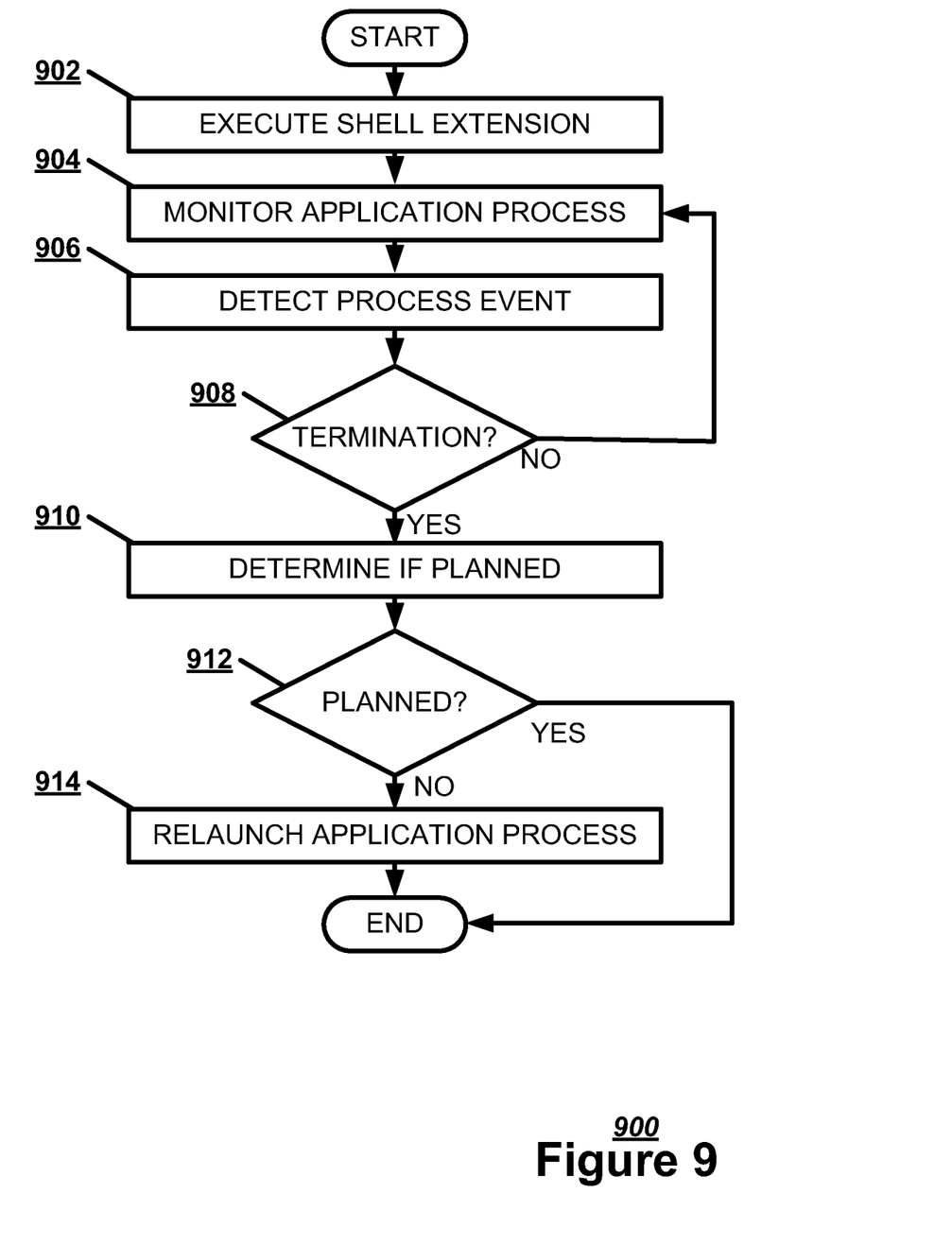
FIG. 9 illustrates, in a flowchart, one embodiment of a method of protecting an application process with the relaunch system.

FIG. 9 illustrates, in a flowchart, one embodiment of a method 900 of protecting an application process with a relaunch system 800. The user relaunch shell extension 815 may execute from the file manager 810 (Block 902). The user relaunch shell extension 815 may monitor an application process 220 (Block 904). The user relaunch shell extension 815 may detect a process event occurring within the application process 220 (Block 906). The process event may be a termination of the application for any reason. If the application process does not terminate (Block 908), the user relaunch shell extension 815 returns to monitoring the application process 220 (Block 904). If the application process 220 terminates (Block 908), then the user relaunch shell extension 815 may determine if the termination was a planned termination (Block 910). A planned termination is one that occurs because the application process 220 has completed its task or because the user has ended the application process. An unplanned termination is one that occurs because of a malware attack, an internal bug, a user response to an internal bug, or other reasons contra to the desire of the user. If the termination was unplanned (Block 912), then the user relaunch shell 815 may relaunch the application process 220 (Block 914).

Although the subject matter has been described in language specific to structural features and/or methodological acts, it is to be understood that the subject matter in the appended claims is not necessarily limited to the specific features or acts described above. Rather, the specific features and acts described above are disclosed as example forms for implementing the claims.

Embodiments within the scope of the present invention may also include non-transitory computer-readable storage media for carrying or having computer-executable instructions or data structures stored thereon. Such non-transitory computer-readable storage media may be any available media that can be accessed by a general purpose or special purpose computer. By way of example, and not limitation, such non-transitory computer-readable storage media can comprise RAM, ROM, EEPROM, CDROM or other optical disk storage, magnetic disk storage or other magnetic storage devices, or any other medium which can be used to carry or store desired program code means in the form of computer-executable instructions or data structures. Combinations of the above should also be included within the scope of the non-transitory computer-readable storage media.

Embodiments may also be practiced in distributed computing environments where tasks are performed by local and remote processing devices that are linked (either by hardwired links, wireless links, or by a combination thereof) through a communications network.

Computer-executable instructions include, for example, instructions and data which cause a general purpose computer, special purpose computer, or special purpose processing device to perform a certain function or group of functions. Computer-executable instructions also include program modules that are executed by computers in standalone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Although the above description may contain specific details, they should not be construed as limiting the claims in any way. Other configurations of the described embodiments are part of the scope of the disclosure. For example, the principles of the disclosure may be applied to each individual user where each user may individually deploy such a system. This enables each user to utilize the benefits of the disclosure even if any one of a large number of possible applications do not use the functionality described herein. Multiple instances of electronic devices each may process the content in various possible ways. Implementations are not necessarily in one system used by all end users. Accordingly, the appended claims and their legal equivalents should only define the invention, rather than any specific examples given.

We claim:

1. A machine-implemented method for malware protection of a computing device, comprising:
    executing a watchdog filter driver integrated with an operating system kernel;
    intercepting an open handle request to an application process with the watchdog filter driver to detect a malware event;
    determining with the watchdog filter driver an originating process for the malware event;
    filtering an open handle to remove a process access for the originating process; and
    detecting if the application process terminates.

2. The method of claim 1, further comprising:
    monitoring a system registry with the watchdog filter driver to detect a malware registry attack.

3. The method of claim 1, further comprising:
    monitoring a file system with the watchdog filter driver to detect a malware file attack.

4. The method of claim 1, further comprising:
    preventing a successful malware process attack with the watchdog filter driver.

5. The method of claim 1, further comprising:
    detecting a callback invoked by a resource manager for the application process; and
    checking a monitored process list for the application process.

6. The method of claim 1, further comprising:
    setting a minimum administrative privilege level for disabling the watchdog filter driver.

7. The method of claim 1, further comprising:
    relaunching the application process using a watchdog service upon termination of the application process.

8. The method of claim 1, further comprising:
    relaunching the application process using a user relaunch shell extension upon termination of the application process.

9. The method of claim 8, wherein the user relaunch shell extension is an icon-type shell extension.

10. A tangible machine-readable storage medium having a set of instructions detailing a method stored thereon that when executed by one or more processors cause the one or more processors to perform the method, the method comprising:
- intercepting an open handle request to an application process with a watchdog filter driver to detect a malware event;
- determining an originating process for the malware event with the watchdog filter;
- filtering an open handle to remove a process access for the originating process; and
- detecting if the application process terminates.

11. The tangible machine-readable storage medium of claim 10, wherein the watchdog filter driver is integrated with the operating system kernel.

12. The tangible machine-readable storage medium of claim 10, wherein the method further comprises:
- monitoring a system registry with the watchdog filter driver to detect a registry attack.

13. The tangible machine-readable storage medium of claim 10, wherein the method further comprises:
- monitoring a file system with the watchdog filter driver to detect a file attack.

14. The tangible machine-readable storage medium of claim 10, wherein the method further comprises:
- preventing the malware event with the watchdog filter driver.

15. The tangible machine-readable storage medium of claim 10, wherein the method further comprising:
- relaunching the application process using a watchdog service upon termination of the application process.

16. The tangible machine-readable storage medium of claim 10, wherein the method further comprising:
- relaunching the application process using a user relaunch shell extension upon termination of the application process.

17. A malware protection system for a computing device, comprising:
- a data storage device to store a watchdog filter driver integrated with an operating system kernel; and
- a processor to intercept an open handle request to an application process with the watchdog filter driver to detect a malware event, determine an originating process for the malware event with the watchdog filter driver, filtering an open handle to remove a process access for the originating process; and detects if the application process terminates.

18. The malware protection system of claim 17, wherein the watchdog filter driver prevents the malware event.

19. The malware protection system of claim 17, wherein the watchdog filter driver implements a watchdog service to relaunch the application process upon termination of the application process.

20. The malware protection system of claim 17, wherein the watchdog filter driver monitors a system registry to detect a malware registry attack.

* * * * *